Dec. 25, 1923.

H. A. MORTON ET AL 1,478,576

PATCH AND METHOD OF MAKING SAME

Filed Nov. 16, 1921

Inventors:
Harold A. Morton,
Marion M. Harrison,
by Spear Middleton Donaldson & Hall
Attys.

Patented Dec. 25, 1923.

1,478,575

UNITED STATES PATENT OFFICE.

HAROLD A. MORTON AND MARION M. HARRISON, OF AKRON, OHIO, ASSIGNORS TO THE MILLER RUBBER COMPANY, OF AKRON, OHIO, A CORPORATION OF OHIO.

PATCH AND METHOD OF MAKING SAME.

Application filed November 16, 1921. Serial No. 515,620.

*To all whom it may concern:*

Be it known that we, HAROLD A. MORTON and MARION M. HARRISON, citizens of the United States, and residents of Akron, in the county of Summit and State of Ohio, have invented certain new and useful Improvements in Patches and Methods of Making Same, of which the following is a specification.

Our present invention relates to improvements in methods of forming sheet rubber material having its opposite faces respectively of cured and uncured rubber, and the invention aims to provide a sheet which will possess ample elasticity, and which will retain for an indefinite period its characteristics of tackiness on one face and elasticity on the other, or in other words, its respective cured and uncured condition.

The invention further aims to provide sheet material of a laminated form in which the laminations will be permanently united and yet possess a surface layer of unvulcanized material which will remain permanently unvulcanized.

Such a material is capable of many uses among which are the manufacture of patches or patching material for repairing punctured rubber tubes and other rubber articles, for making hollow inflated articles such as tire tubes in which the interior surface is unvulcanized and hence self healing, or tennis and other playing balls which will be self healing or which may be inflated after manufacture by hypodermic gas injection on any point of the ball.

With the foregoing and other objects in view, the invention comprises the novel method of procedure hereinafter described and particularly defined by the appended claims.

Our invention is illustrated in the accompanying drawing, in which—

Our improved material is manufactured in sheet form and of a size corresponding to the nature of the articles to be made therefrom, or in large sheets to be cut up into smaller ones, or blanks, of the required size, and such a sheet is shown in the accompanying drawings, but it will be obvious that the size of the sheet is immaterial.

Figure 1:
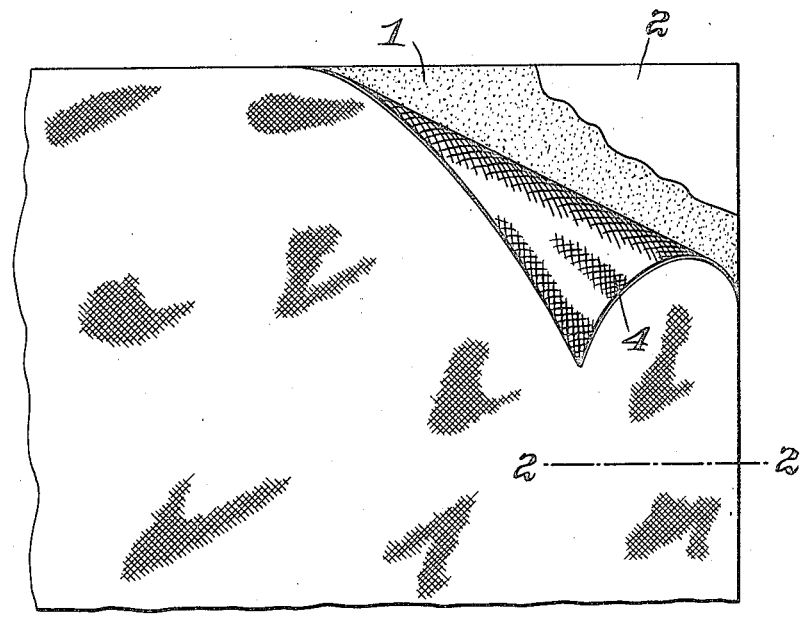
Fig. 1 is a plan view partly broken away showing a sheet of material.
Figure 2:
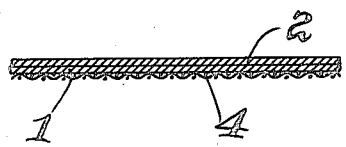
Fig. 2 is a section on line 2—2 of Fig. 1.

Our improved material comprises a laminated sheet composed of two layers of rubber stock of an aggregate thickness corresponding to the thickness of the desired sheet. One of these layers is made from a rubber compound containing sulphur, and the other from a rubber compound containing an accelerator of such a nature that it will not migrate. The sulphur and accelerator containing layers are superimposed one upon the other, as shown in Fig. 1, in which the numeral 1 designates the sulphur containing layers, and the numeral 2 the accelerator containing layer.

The assembled layers are subjected to a vulcanizing heat of a temperature insufficient to vulcanize the sulphur containing layer, but as the sulphur migrates into the adjoining layer it comes into contact with the non-migratory accelerator which effects vulcanization of this layer. Owing to the non-migratory nature of the particular accelerator employed the sulphur in the sulphur containing layer will be unaffected thereby and will remain unvulcanized.

In proceeding according to our improved process the layer 1 is formed by the use of any suitable rubber mixing apparatus, and calender, not necessary to be shown herein, from a rubber compound containing sulphur but no accelerator, and the layer 2 in a similar manner from a rubber compound containing a special accelerator of a non-migratory character, but no sulphur.

The layer 1 would contain an amount of sulphur sufficient to migrate to sheet 2 and in cooperation with the accelerator therein to effect vulcanization thereof, while similarly the sheet 2 would contain a quantity of non-migratory accelerator capable of coacting with the migrated sulphur to effect the vulcanization of the layer. When conditions require, such as in patching material, a protective fabric 4 is placed over the exposed surface of the layer 1. Thereafter the composite sheet is subjected to a temperature sufficiently high to effect vulcanization and under the action of the increased temperature the sulphur migrates into the adjoining layer and interacts with the accelerator therein to effect the vulcanization of the layer 2 and the firm union of the two layers.

As the sulphur containing layer 1 is not cured by the heat it remains permanently in its unvulcanized condition so that by stripping off the protective muslin and the application of the solvent, such as gasoline, thereto, the necessary cementing surface will be formed for adhering to the tube to be patched.

We have found that by the process above described we can secure a two ply material which possesses ample elasticity, one in which the layers are firmly united together by vulcanization, and one in which the surface layer will be of unvulcanized material, which condition it will retain indefinitely, or in other words, it will not be liable to become subsequently vulcanized or hardened, and we thereby avoid serious objections which have been found to materials heretofore produced of which we are aware.

Any non-migratory accelerator may be used whether organic or inorganic.

As an example of the manufacture of such sheet material two separate batches of rubber may be prepared according to the following formulæ and separately mixed in the usual manner upon mill rolls:

*Batch I.—Part to remain uncured.*

|  | Parts. |
|---|---|
| Smoked sheet rubber | 74 |
| Sulphur | 12 |
| Vermillion | 3 |
| Zinc oxide | 2 |
| Blanc fixe | 9 |
|  | 100 |

*Batch II.—Part to be cured.*

|  | Parts. |
|---|---|
| Smoked sheet rubber | 74 |
| Lime | 20 |
| Zinc oxide | 2 |
| Vermillion | 3 |
| Blanc fixe | 1 |
|  | 100 |

This stock may be cured for 24 hours in dry heat at 105° C. at which time the back of the stock is cured while the face is completely uncured.

If a more rapid curing stock is desired the lime accelerator may be increased, for example, if the lime content be increased to 50 per cent the stock may be well cured in 10 hours at 115° dry heat.

It will be readily understood that the vermillion and blanc fixe have no active part and the zinc oxide very little to do with the curing of the resulting compounds, but are used to color and give the proper texture and weight to the compound. They may, of course, be eliminated from the compound or replaced by other compounding ingredients of an inert nature.

Curing is accomplished by placing in an oven heated to the desired temperature.

It will be obvious that the invention is not limited to a two ply material as for example three plies could be superimposed, the center having sulphur only, and the two surface sheets non-migratory accelerator only, in which event the center would be uncured; or the non-migratory accelerator could be placed in the center, in which case, the center only would be cured and the surfaces, or outside layers uncured.

Attention must be called to the fact that in the stocks so built that a ply on the outside remains uncured, such ply can be afterwards vulcanized by the application of higher temperatures, such as would vulcanize stocks containing sulphur but no accelerator; for instance, inner tube patch stock may be applied to a punctured tube by simply applying gasoline to the uncured side and affixing it to the cleaned surface of the tube, following the ordinary roadside procedure. After the patch has been used in this condition, it may be placed between steam heated press plates and vulcanized to the tube permanently as in repair shop practice.

It will be understood that the layers may be of any relative thickness. For patching material the uncured layer which forms the cement should be thin, whereas the cured layer representing the strength or body of the patch should be much thicker. Also for use in patching material the surface of the uncured layer should have a covering of Holland cloth or the like to be stripped off before use.

For some articles the uncured layer may be as thick or thicker according to requirements.

In the manufacture of self-healing articles, a thicker unvulcanized layer would be required and in articles such as inner tubes for tires, for example, the unvulcanized layer would be on the inside and unprovided with a muslin or like covering.

It will be understood that the sulphur containing layer must contain enough sulphur to cause, after migration has taken place, the desired percentage of sulphur to rubber throughout the entire articles, it being understood that the sulphur could not all migrate to the accelerator containing layer. It might be desirable, for instance, to have the amount of sulphur which migrates to the accelerator stock equal to two percent of the rubber in that stock in which case enough sulphur would have to be incorporated in the sulphur containing ply to equal two percent of the rubber in both plies. The desired percent of sulphur is goverened in practice by the particular accelerator selected and would vary with different accelerators. The accelerator on the other hand is balanced against only the rubber in the accelerator ply.

Other examples using different accelerators are as follows:

*Batch I.—Part to remain uncured.*

| | Parts. |
|---|---|
| Smoked sheet rubber | 74 |
| Sulphur | 12 |
| Ultramarine blue | 5 |
| Zinc oxide | 2 |
| Blanc fixe | 7 |
| | 100 |

*Batch II.—Part to be cured.*

| | Parts. |
|---|---|
| Smoked sheet rubber | 74 |
| Magnesium oxide | 20 |
| Zinc oxide | 1 |
| Ultramarine blue | 5 |
| | 100 |

This stock may be cured for 30 hours in dry heat at 105° C.

If a more rapid stock is desired, the magnesium oxide may be increased to any desirable quantity, for example, when the magnesium oxide is present in an amount equal to 50 per cent, that stock will cure in 12 hours at 115° C. dry heat.

*Batch I.—Part to remain uncured.*

| | Parts. |
|---|---|
| First latex rubber | 74 |
| Sulphur | 12 |
| Zinc oxide | 2 |
| Blanc fixe | 12 |
| | 100 |

*Batch II.—Part to be cured.*

| | Parts. |
|---|---|
| First latex rubber | 74 |
| Litharge | 10 |
| Zinc oxide | 2 |
| Blanc fixe | 14 |
| | 100 |

This stock may be cured 20 hours at 100° C. dry heat.

A stock containing 20 per cent litharge may be cured in 8 hours, at 105° C.

Having thus described our invention, what we claim is:

1. The herein described method of forming a sheet or slab of rubber material which comprises superimposing upon each other a plurality of layers of rubber compound, one of said layers comprising a rubber compound containing a non-migratory accelerator, and another layer comprising a rubber compound containing sulphur, and thereafter subjecting the composite sheet to a temperature sufficient to cause the sulphur to migrate and coact with the non-migratory accelerator.

2. The herein described method of forming a sheet of patching material which comprises superimposing upon each other two layers of rubber compound, one containing a non-migratory accelerator, and the other sulphur, the proportion of sulphur in the second layer being sufficient to migrate to the accelerator containing layers to cooperate with the accelerator to effect vulcanization of said layer and the union of the two layers by vulcanization, and thereafter effecting such vulcanization.

3. The herein described method of forming a sheet of material having one side of unvulcanized rubber and the opposite side of vulcanized rubber, which comprises compounding rubber and sulphur to form the unvulcanized layer, compounding rubber and a non-migrating accelerator to form the vulcanized layer, superimposing the two layers and subjecting to heat at a temperature and for a length of time insufficient to cause vulcanization of the first named layer.

4. The herein described method of forming a sheet of material having one side of unvulcanized rubber compound and the remaining side of vulcanized rubber compound which consists in forming the unvulcanized side of a vulcanizable compound, forming the vulcanized side from a compound which contains accelerator but is separately unvulcanizable, superimposing the two compounds, and vulcanizing the separately unvulcanizable layer at a temperature below that at which the vulcanizable layer will be vulcanized.

5. The herein described method of forming a rubber article which consists in superimposing two layers, one of which contains accelerator but no sulphur, the other of which contains sulphur, and subjecting to heat insufficient to vulcanize the layer which contains sulphur, but sufficient to vulcanize the other layer by migration of the sulphur.

6. The herein described method of forming a rubber article which comprises forming one part of the article from a rubber compound, containing a non-migrating accelerator but no sulphur, permeating said part of the article with sulphur by migration from an adjoining part and vulcanizing said first part at a temperature below that necessary to vulcanize the adjoining part.

In testimony whereof, we affix our signatures.

HAROLD A. MORTON.
MARION M. HARRISON.